US010558228B1

United States Patent
Chavez et al.

(10) Patent No.: US 10,558,228 B1
(45) Date of Patent: Feb. 11, 2020

(54) FLOW MONITORING DEVICE AND SYSTEM

(71) Applicant: United Services Automobile Association (USAA), San Antonio, TX (US)

(72) Inventors: Carlos JP Chavez, San Antonio, TX (US); Eric Schroeder, San Antonio, TX (US); Manfred Amann, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 422 days.

(21) Appl. No.: 15/365,759

(22) Filed: Nov. 30, 2016

Related U.S. Application Data (60) Provisional application No. 62/351,451, filed on Jun. 17, 2016.

(51) Int. Cl.
G05D 7/06 (2006.01)
G05B 15/02 (2006.01)
G05F 1/66 (2006.01)

(52) U.S. Cl.
CPC .......... G05D 7/0676 (2013.01); G05B 15/02 (2013.01); G05F 1/66 (2013.01)

(58) Field of Classification Search
CPC .......... G05D 7/0676; G05B 15/02; G05F 1/66
USPC ...................................................... 700/282
See application file for complete search history.

(56) References Cited

U.S. PATENT DOCUMENTS

| 4,729,106 | A  | * | 3/1988  | Rush ........................ | G01F 1/00 137/236.1 |
| 4,888,706 | A  | * | 12/1989 | Rush ........................ | G01F 1/00 700/283 |
| 9,684,312 | B1 | * | 6/2017  | Eyring ................. | G05D 7/0676 |
| 9,939,297 | B1 | * | 4/2018  | Eyring ................. | G05D 7/0676 |
| 2005/0107924 | A1 | * | 5/2005 | Bailey .................... | A01G 25/16 700/284 |
| 2009/0204263 | A1 | * | 8/2009 | Love ...................... | G05D 23/19 700/282 |
| 2009/0271045 | A1 | * | 10/2009 | Savelle, Jr. .......... | A01G 25/167 700/284 |
| 2009/0309755 | A1 | * | 12/2009 | Williamson ........... | G01D 4/004 340/870.02 |
| 2010/0030389 | A1 | * | 2/2010 | Palmer ................... | A01G 25/16 700/284 |
| 2010/0185364 | A1 | * | 7/2010 | McClure .............. | A01B 69/008 701/41 |
| 2010/0268391 | A1 | * | 10/2010 | Anderson ............ | A01G 25/167 700/284 |
| 2010/0289652 | A1 | * | 11/2010 | Javey ...................... | H04Q 9/00 340/605 |
| 2011/0054642 | A1 | * | 3/2011 | Bondar .................. | G05B 15/02 700/29 |
| 2011/0066297 | A1 | * | 3/2011 | Saberi ................... | F16K 31/046 700/287 |

(Continued)

*Primary Examiner* — Sheikh Maruf
(74) *Attorney, Agent, or Firm* — Fletcher Yoder, P.C.

(57) ABSTRACT

A device that detects fluid flow may include a housing member that couples to a conduit and an apparatus that outputs the fluid. The device may also include a flow mechanism that detects the fluid flow through the conduit and the apparatus and a transmitter that transmits a signal indicative of the fluid flow to a computing device.

17 Claims, 3 Drawing Sheets

(56) References Cited

U.S. PATENT DOCUMENTS

| | | | |
|---|---|---|---|
| 2011/0077785 A1* | 3/2011 | Nickerson | A01G 25/16 700/284 |
| 2011/0166712 A1* | 7/2011 | Kramer | G05D 23/1919 700/278 |
| 2011/0282498 A1* | 11/2011 | Freudenberger | F24D 11/003 700/282 |
| 2012/0239211 A1* | 9/2012 | Walker | A01G 25/16 700/284 |
| 2013/0110296 A1* | 5/2013 | Khoo | G06F 1/26 700/286 |
| 2013/0201316 A1* | 8/2013 | Binder | H04L 67/12 348/77 |
| 2014/0045409 A1* | 2/2014 | Zhang | B24C 7/0046 451/2 |
| 2014/0336827 A1* | 11/2014 | Gromes, Sr. | G06F 3/01 700/282 |
| 2015/0316936 A1* | 11/2015 | McCarrick | G05D 7/0635 700/282 |
| 2015/0319941 A1* | 11/2015 | Klein | A01G 25/162 700/284 |
| 2015/0372832 A1* | 12/2015 | Kortz | G05B 15/02 700/278 |
| 2015/0379785 A1* | 12/2015 | Brown, Jr. | A01B 79/005 701/29.1 |
| 2016/0037736 A1* | 2/2016 | Rainone | A01G 25/16 700/284 |
| 2016/0076231 A1* | 3/2016 | Goel | E03C 1/055 700/283 |
| 2017/0235317 A1* | 8/2017 | Cummings | G05D 7/0635 700/282 |
| 2019/0101421 A1* | 4/2019 | Sankaran | G01F 1/34 |

\* cited by examiner

FLOW MONITORING DEVICE AND SYSTEM

CROSS REFERENCE TO RELATED APPLICATIONS

This application claims priority to U.S. Provisional Patent Application Ser. No. 62/351,451 filed Jun. 17, 2016, which is incorporated herein by reference in its entirety.

FIELD OF THE TECHNOLOGY

The present disclosure, in general relates to flow monitoring devices and systems, and more particularly, to a self-powered water flow monitoring device.

BACKGROUND

Water shut-off valves and systems are known. Some of them are based on monitoring a continuous flow of water. The problem with such a system is that eventually an acceptable continuous flow, such as from a leaking valve in a toilet tank, will accumulate until a fault condition is indicated and shut off the flow of water when, in fact, a serious fault condition does not exist.

Also, certain other types of continuous flow systems are more complex and require that a second flow sensor be installed in a drain line and then connected to the system so as to determine when a protracted or excessive flow of water is nevertheless acceptable, because it is not then believed to be accumulating in the house. This is hardly foolproof as considerable damage may be occurring yet the water may eventually find its way to a drain. Also such a system is more complex to install and to maintain.

Still other known systems do not allow for varying conditions, such as occur during seasonal changes when, for example, a lawn is to be watered in the summer and then only on particular days, or for special situations such as when the family is away from the home on vacation. For example, some of these prior systems specifically require that physical installation of the system occur after water has already been acquired for sprinkler use, thereby rendering the system ineffective in detecting leaks involving the sprinkler system.

Other systems are not well suited for use in commercial installations where potentially high flow rates are likely to occur, and when, during normal use, a continuous flow may be present simply due to many users having intermittent requirements that occasionally result in a protracted uninterrupted continuous flow that can be misinterpreted as a fault condition (leak) that results in stopping the flow of water when it is not desired.

Accordingly, there exists today a need for a water flow monitoring system and leak detection system that is self-learning and adapts to varying water usage patterns, and is suitable for use in commercial buildings as well as in private residences and thus an improvement upon the above mentioned prior art techniques.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a water flow detection device and system are described in which a water flow detection sensor device is positioned at the outlet portion of a water system (e.g., a faucet, dish washer, bath tub, shower, etc.). In one exemplary illustrated embodiment, the sensor device contains a Bluetooth LE beacon which is activated and turned on when water is flowing through the sensor device, which in turn enables detecting leaks in a water conduit system. For instance, if water is flowing in a conduit system and all the beacons are in an off state, this may be evidence of a water leak in the conduit system. In additional illustrated embodiments, data may also be derived and recorded as to water usage regarding various appliances and water outlets such that the system is operative and configured to determine whether water is leaking or is rather associated with flow from normal usage.

In another aspect, the aforesaid beacon signal is automatically activated, and de-activated, and is self-sustaining obviating the need to couple to a permanent power supply or replace batteries. In accordance with an illustrated embodiment, this is achieved via a turbine element that in addition to detecting water flow is also used to generate the nominal amount of electrical power needed to activate beacon as water flows through it. Hence, once the water flow stops, movement of the turbine likewise stops causing simultaneous deactivation of the beacon.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below preferably include a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
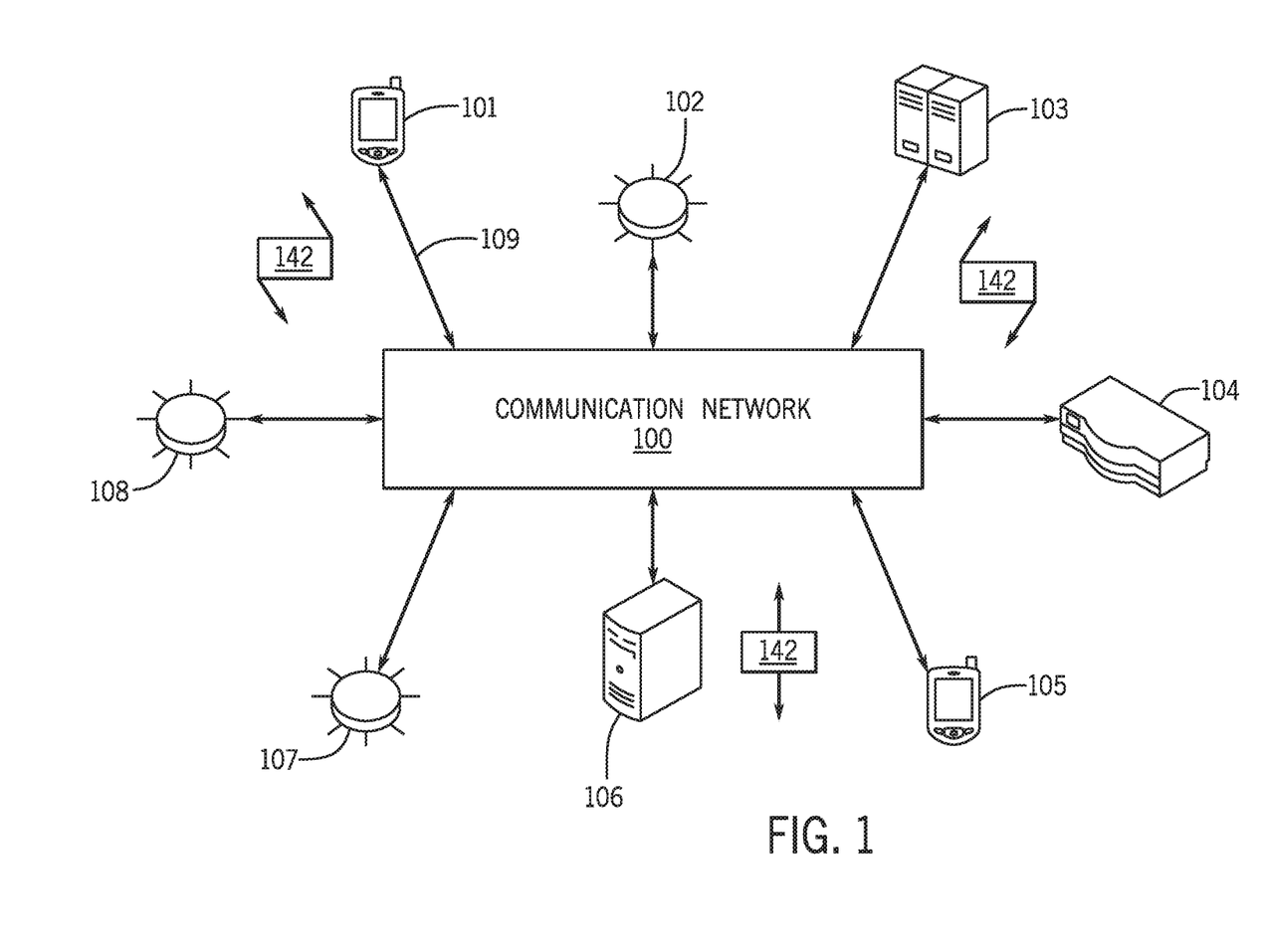
FIG. 1 illustrates an example communication network used in conjunction with one or more illustrative embodiments.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, gaming/media consoles, smart watches, smart wristbands, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
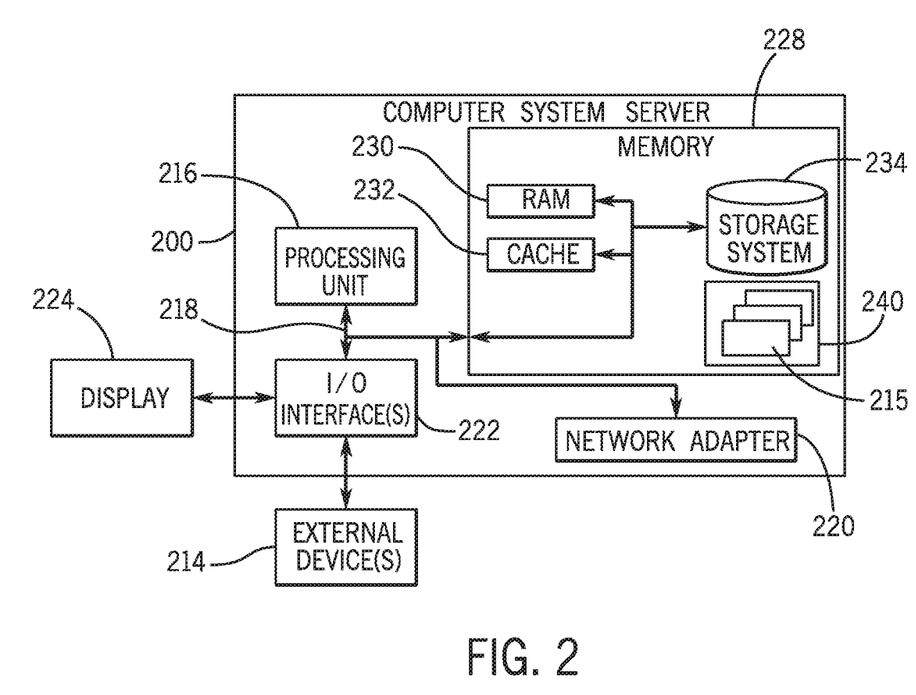
FIG. 2 illustrates an example computer controlled network device/node used in conjunction with one or more illustrative embodiments.

FIG. 2 is a schematic block diagram of an example network computing device 200 (e.g., a water flow detection device 300) (e.g., client computing device 103, smart phone device 105, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Monitor module 200 is intended to represent any type of computer system capable of carrying out the teachings of various embodiments of the present disclosure. Monitor module 200 is only one example of a suitable system and is not intended to suggest any limitation as to the scope of use or functionality of embodiments of the disclosure described herein. Regardless, monitor module 200 is capable of being implemented and/or performing any of the functionality set forth herein.

Monitor module 200 is operational with numerous other general purpose or special purpose computing system environments or configurations. Examples of well-known computing systems, environments, and/or configurations that may be suitable for use with monitor module 200 include, but are not limited to, micro-controllers, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Monitor module 200 may be described in the general context of computer system-executable instructions, such as program modules, being executed by a computer system. Generally, program modules may include routines, programs, objects, components, logic, data structures, and so on that perform particular tasks or implement particular abstract data types. Monitor module 200 may be practiced in distributed data processing environments where tasks are performed by remote processing devices that are linked through a communications network. In a distributed data processing environment, program modules may be located in both local and remote computer system storage media including memory storage devices.

Monitor module 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Monitor module 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive") and from remote located database (e.g., "cloud" based storage devices). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other media (e.g., a USB storage device) can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 215, such as a water flow detection module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

Monitor module 200 may also communicate with one or more external devices 214 (either via a wired connection or wireless), such as a keyboard, smart phone device, a pointing device, a display 224, etc.; one or more devices that enable a user to interact with monitor module 200; and/or any devices (e.g., network card, modem, etc.) that enable monitor module 200 to communicate with one or more other computing devices. Such communication can occur via Input/Output (I/O) interfaces 222. Still yet, monitor module 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
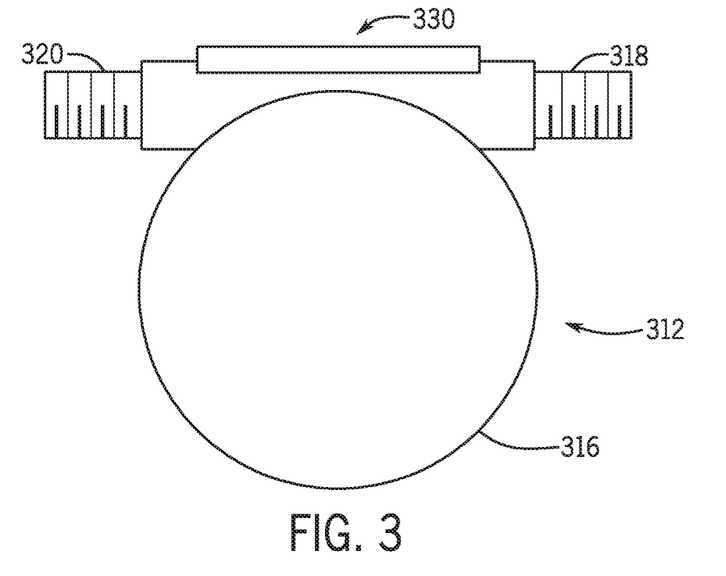
FIG. 3 illustrates an illustrative embodiment of a flow detection device.

With the exemplary communication network 100 (FIG. 1) and monitor module 200 (FIG. 2) being generally shown and discussed above, description of certain illustrated embodiments of the present disclosure will now be provided. With reference now to FIG. 3, it is to be understood and appreciated significant development and use of "smart home" related technologies have been made and the smart home sector is advancing rapidly. The illustrated embodiments provides a device 300 for detecting flow through a conduit 310 for enabling centralized monitoring of water flow in appliance devices 400. It is to be understood, water flow appliance devices 400 as referred to herein consists of devices that consume and/or dispense water, such as (but not limited to a: faucet; shower; bath tubs; toilet; clothes washer machine; dishwasher; refrigerator; freezer; HVAC unit; and humidifier). It is to be appreciated that while the preferred embodiment of device 300 is for detecting water flow through a conduit 310, it is to be understood device 300 may be configured to detect other flow types through a conduit (e.g., gas, compressed air, petroleum based fluids (heating oil) and other fluids). For instance, device 300 may be configured to detect natural gas flow or heating oil flow through a conduit leading to a furnace appliance device 400. However, for ease of illustration and description purposes only, device 300 is described herein in reference to water flow detection.

Figure 4:
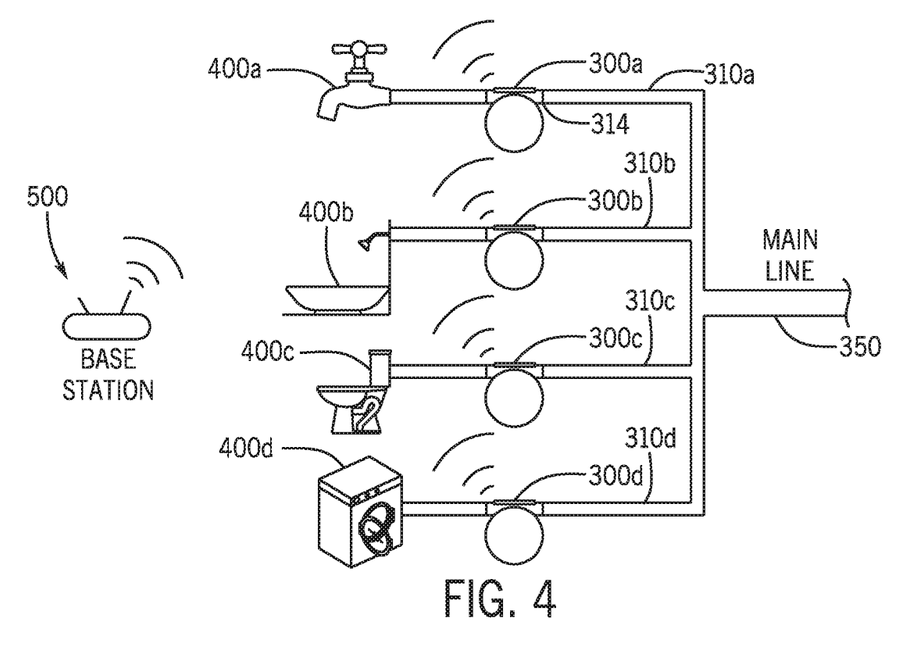
FIG. 4 illustrates a systematic diagram depicting an operating environment for a plurality of flow detection devices of FIG. 3.

The water flow detection device/apparatus 300 illustrated in FIG. 3 is configured to detect and electronically report water flow in a conduit 310 connected thereto in accordance with the description herein. Water flow device 300 generally includes a housing member 312 configured to couple to an open/end portion of a conduit 310 (FIG. 4) such that water flowing through the conduit 310 is caused to flow through the housing member 312. As best shown in FIG. 4, housing member 312 preferably couples in-line with a conduit 310. For instance, an input portion of the housing member 312 couples to an end portion 314 of the conduit and the output portion of the housing member 312 couples to a flow destination device 400. It is to be appreciated the housing member 312 may be constructed of any suitable material, or combination of materials (e.g., plastic, metal, etc.), suitable for a particular use. In accordance with an illustrated embodiment, the housing member 312 includes a main body portion 316, and an input portion 318 and an output portion 320 extending from the main body portion 316 whereby water flow through the coupled conduit 310 flows through the input portion 318, so as to enter and flow through, the main body portion 316 and exit therefrom via the output portion 320. Preferably, each of the input and output portions (318, 320) are cylindrically shaped having a diameter slightly greater than, or less than, the conduit 310 and/or appliance coupling 400, it is to couple thereto. Also, the input and output portions (318, 320) of the main body portion 316 preferably detachably couple to a conduit portion 310 (or destination device 400) through any known suitable means (e.g., a clamp assembly, threaded assembly and the like).

With regards to the main body portion 312 of the housing member 316, it generally includes a flow mechanism for detecting water flow from the coupled conduit 310. Preferably, the flow mechanism includes a turbine element for detecting water flow, whereby water flow in the main body portion 312 causes rotation of the turbine element thus evidencing water flow in the coupled conduit 310.

The flow mechanism further preferably includes a communication device 330 (represented as client computing device 103 in FIG. 1) affixed to a portion of the housing member 312 and operatively coupled to the flow mechanism. The communication device 330 preferably includes a microprocessor operatively coupled to the flow mechanism whereby detection of water flow by the flow mechanism (e.g., movement of the turbine) causes the microprocessor to determine water flow in the housing member 312, and thus in the conduit coupled thereto. It is to be appreciate the microprocessor may be further configured to determine an amount of water flow (e.g., volume) flowing through the housing 312 over a period of time in other illustrative embodiments.

The communication device 330 further includes a transmitting component (e.g., a Bluetooth beacon transmitter) configured to communicatively couple to a remote computing device 500 (e.g., a client computing device 103, smart phone/tablet device 105, server device 106, etc.) to transmit a signal to the remote computing device 500 indicative of the aforementioned detected water flow. It is to be appreciated the transmitting component may be wired coupled, and/or wirelessly coupled, to the remote computing device 500 though any known communication protocol, including (but not limited to Bluetooth, WLAN, LAN, Wi-Fi, RF and the like). For instance, the transmitting component may include a Bluetooth Beacon for transmitting Bluetooth signals to the remote computing device 500, or the transmitting device may include a Wi-Fi transmitter having an IP address which communicates to the remote computing device 500 via a LAN network 100. It is to be further appreciated the communication device 330 may detachably affix to the housing member 312 for ease of replacement and/or maintenance.

In one illustrative embodiment, the communication device 330 (e.g., a Bluetooth beacon) is preferably self-powered whereby the flow mechanism 330 preferably includes an electric generation device such that water flow causes activation of the electric generation device which provides the nominal charge to the communication device 330 required to operate the communication device 330. That is, when water flow is caused to flow through device 300, this in turn automatically activates the communication device 330 to transmit a signal indicating such water flow, and when the water flow ceases in the device 300, the communication device 330 is automatically deactivated. Simply put, the communication device 330 automatically turns on with water flow and automatically turns off with stoppage of water flow.

In another illustrative embodiment, the communication device 330 preferably includes a battery source for powering elements contained therein requiring electrical power. The battery source is preferably rechargeable, wherein the communication device 330 preferably includes a charging device which links to the aforesaid flow mechanism such that movement of the flow mechanism (e.g., a turbine element), caused by water flow in the housing member 312, is harnessed by the charging device so as to charge the aforesaid rechargeable battery source. Thus, the communication device 330 in accordance with the aforementioned illustrated embodiments, is self-powered. Hence, the communication device 330 is operative and configured to send signals to the remote computing device 500 indicating whether water is flowing in a conduit coupled to the housing member 312 associated with the communication device 300, and in certain embodiments, an amount of water flowing there through as mentioned above.

With an illustrated embodiment of the water flow detection device 300 being described above with reference FIG. 3 (as well as FIGS. 1 and 2), it's description of use in an exemplary operating environment will now be provided below with reference to FIG. 4 (and continuing reference to FIGS. 1-3).

As shown in FIG. 4, a main water supply line 350 is fluidly coupled to a plurality of conduits 310 for supplying a water source (e.g., city water supply) to preferably water destination appliances 400 coupled to conduits 310 for providing water flow from the main supply 350. As shown in FIG. 4, the water destination appliances 400 may include a (and are not to be understood to be limited to): faucet; shower; toilet and clothes washer machine. Fluidly coupled, preferably in-line with each conduit 310, is a water flow detection 310 as described above.

In the illustrated embodiment of FIG. 4, each water flow detection device 300 has a communication component 330 configured to wirelessly communicate (e.g., Bluetooth, WLAN, LAN, Wi-Fi, RF and the like) with a remotely located central computing device 500 (e.g., client computing device 103 or server 106 of FIG. 1). It is to be appreciated that central computing device 500 may be a cloud based server device or may communicate with a cloud based server device. Further, the central computing device 500 may be associated with a database indicating a water flow destination device 400 associated with each said conduit 310. Thus, when a signal is received from device 300*b* indicating water flow, central computing device 500 is enabled to analysis this data to indicate shower destination device 400*b* is receiving water flow for the main line 350.

In accordance with one or more illustrated embodiments, central computing device 500 may be further configured to provide user notification when an anomaly is detected regarding water flow through a said conduit 310. For instance, if washer machine appliance 400*d* is in an off state, and water flow is detected through detection device 300*d*, this would be indicative of a water leak associated with device 400*d* and/or a conduit supplying water flow thereto. Such notification is preferably provided via a user display and/or audio warnings via a user computing device (e.g., smart phone 105) operatively coupled to the central computing device 500. And with regards to determining when an anomaly is detected regarding water flow through a said conduit 310, this disclosure is to be understood to be related to commonly assigned application Ser. No. 62/351,427 filed on Jun. 17, 2016 (the contents of which are hereby incorporated in their entity) which further describes a system and process for determining and detecting water flow anomalies to appliance devices.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A device configured to detect fluid flow, wherein the device comprises:
 a housing member configured to couple to a conduit, wherein the conduit is configured to supply a fluid to an apparatus configured to output the fluid;
 a flow mechanism comprising a turbine, wherein the flow mechanism is configured to detect the fluid flow through the conduit to the apparatus based on a rotation of the turbine, wherein the turbine is configured to output an electrical charge to a battery source;
 an electric generation device configured to provide the electrical charge; and
 a transmitter configured to transmit a signal indicative of the fluid flow to a computing device, wherein the battery source is configured to power the transmitter, wherein the transmitter is configured to transmit the signal only when the electric generation device provides the electrical charge to the transmitter, wherein the transmitter is configured to stop transmitting the signal to the computing device when the fluid flow stops.

2. The device of claim 1, wherein the housing member is configured to detach from the conduit.

3. The device of claim 1, wherein the flow mechanism is configured to determine an amount of volume of the fluid flow through the housing member based on the rotation of the turbine.

4. The device of claim 3, wherein the fluid flow detected based on the rotation of the turbine and operative data provided by the apparatus, wherein the operative data is indicative of a fluid leak or normal fluid usage.

5. The device of claim 1, comprising a processor configured to determine an amount of the fluid flow through the apparatus.

6. A system, comprising:
a fluid detection apparatus configured to couple to a conduit configured to supply a fluid to a fluid destination device configured to output the fluid, wherein the fluid detection apparatus comprises a turbine, wherein the fluid detection apparatus is configured to detect a fluid flow through the conduit to the fluid destination device based on a rotation of the turbine, wherein the turbine is configured to output an electrical charge;
an electric generation device configured to provide the electrical charge;
a transmission component configured to transmit a beacon signal to a computing system when the fluid detection apparatus detects the fluid flow, wherein the transmission component is configured to transmit the beacon signal only when the electric generation device provides the electrical charge to the transmission component, wherein the transmission component is configured to stop transmitting the beacon signal to the computing system when the fluid flow stops; and
a battery source configured to receive the electrical charge from the turbine, wherein the battery source is configured to provide power to the transmission component.

7. The system of claim 6, wherein the transmission component comprises a Bluetooth Beacon.

8. The system of claim 6, wherein the battery source is rechargeable.

9. The system of claim 6, wherein the computing system is configured to:
determine an operational state of the fluid destination device;
determine whether the fluid flow is present through the conduit to the fluid destination device when the operational state of the fluid destination device is off; and
send a notification to a user computing device indicative of an anomaly when the fluid flow is present through the conduit to the fluid destination device and the operational state of the fluid destination device is off.

10. The system of claim 9, wherein the notification comprises a display warning or audio warning presented via the user computing device.

11. The system of claim 10, wherein the user computing device comprises a smart phone.

12. The system of claim 6, wherein the fluid destination device comprises a faucet, a toilet, or a washer machine.

13. A method, comprising:
receiving, via a processor, a first signal indicative of a fluid flowing through a conduit to a fluid destination device, wherein the first signal is generated based on a rotation of a turbine of a fluid detection device due to the fluid flowing through the conduit, wherein the turbine is configured to output an electrical charge to a battery source configured to power a transmitter component of the fluid detection device; and
transmitting, via the processor, a second signal indicative of the fluid flowing through the conduit to a computing device based on the first signal, wherein the second signal is transmitted via the transmitter component, wherein the transmitter component is configured to transmit the second signal only when an electric generation device configured to provide the electrical charge provides the electrical charge to the transmitter component, wherein the transmitter component is configured to stop transmitting the second signal to the computing device when the fluid flowing stops.

14. The method of claim 13, wherein the second signal comprises information regarding an amount of the fluid flowing through the conduit.

15. The method of claim 13, wherein an amount of the fluid flowing through the conduit is determined based on the rotation of the turbine.

16. The method of claim 13, comprising transmitting, via the processor, a beacon signal to the computing device each time the first signal is received.

17. The method of claim 13, comprising powering the transmitter component off, via the processor, when the first signal is not received.

* * * * *